No. 764,642. PATENTED JULY 12, 1904.
A. STENWALL.
CHECK VALVE.
APPLICATION FILED JULY 21, 1903.
NO MODEL.

Witnesses:
J. B. Weir
D. Perry

Inventor:
Alfred Stenwall,
by Bond Adams Pickard Jackson
his Attys

No. 764,642.

Patented July 12, 1904.

UNITED STATES PATENT OFFICE.

ALFRED STENWALL, OF KEWANEE, ILLINOIS.

CHECK-VALVE.

SPECIFICATION forming part of Letters Patent No. 764,642, dated July 12, 1904.

Application filed July 21, 1903. Serial No. 166,500. (No model.)

*To all whom it may concern:*

Be it known that I, ALFRED STENWALL, a citizen of the United States, residing at Kewanee, in the county of Henry and State of Illinois, have invented certain new and useful Improvements in Check-Valves, of which the following is a specification, reference being had to the accompanying drawings.

My invention relates to check-valves, and has for its object to provide a new and improved check-valve which may be adapted for use in either horizontal, vertical, or inclined positions. I accomplish this object as illustrated in the accompanying drawings and hereinafter described.

What I regard as new is set forth in the claim.

Figure 4:
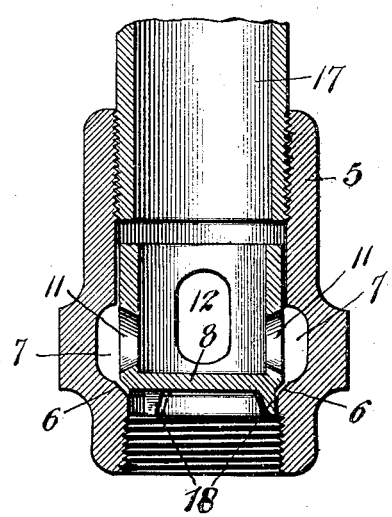
Figure 1:
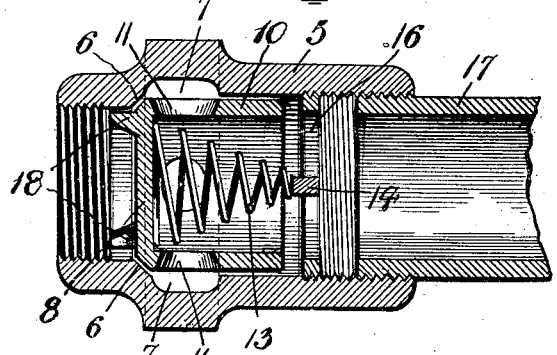
Figure 3:
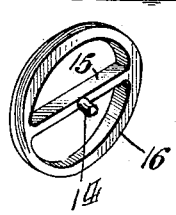
Figure 2:
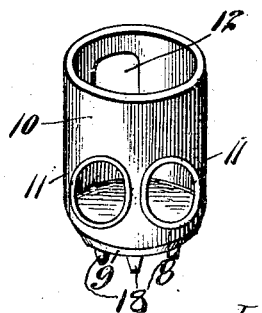

In the accompanying drawings, Figure 1 is a central longitudinal section of my improved valve. Fig. 2 is a perspective view illustrating the movable member thereof. Fig. 3 is a perspective view of the removable ring, and Fig. 4 is a vertical section showing the valve with the spring removed.

Referring to the drawings, 5 indicates the valve-casing, which is cylindrical in form, being screw-threaded at its ends. The casing 5 is provided near one end with a valve-seat 6, which, as shown in Fig. 1, is inclined, preferably at an angle of about forty-five degrees to the inner surface of the casing. Immediately above the seat 6 is provided an annular channel or chamber 7, as shown in Figs. 1 and 4.

8 indicates a valve-disk the edges of which are beveled, as shown at 9 in Fig. 2, to adapt them to fit closely upon the seat 6. The disk 8 carries a sleeve 10, which rises therefrom and is preferably formed integral therewith. Said sleeve is greater in length than the width of the chamber 7, as best shown in Figs. 1 and 4, so that when the disk 8 is upon its seat the upper portion of the sleeve 10 extends beyond the chamber 7. The sleeve 10 thus serves to guide the disk 8 as it moves toward and from its seat.

11 indicates openings in the sleeve 10, which lie opposite the chamber 7, as best shown in Fig. 1. Preferably one of said openings is elongated, as shown at 12 in Figs. 2 and 4.

By this arrangement when the valve-disk 8 is off its seat the liquid or gas may readily flow around the disk through the openings 11 in the sleeve 10.

13 indicates a conical spring which is adapted to fit inside the sleeve 10, its base resting upon the inner surface of the disk 8, as shown in Fig. 1. The apex of the spring 13 is adapted to fit upon a lug 14, projecting from a cross-bar 15, carried by a ring 16, which is screw-threaded and is adapted to screw into the valve-casing 5, as shown in Fig. 1. The ring 16 not only serves as a bearing for the apex of the spring 13, but also serves to limit the movement of the valve-disk 8 away from its seat, since it lies in the path of the sleeve 10.

17 represents a pipe which may be screwed into the casing 5 for connecting up the valve.

From the foregoing description it will be seen that the spring 13 normally holds the disk 8 tightly upon its seat whether the valve be in a vertical or in an inclined position, and as it operates the valve-disk 8 is guided by the sleeve 10, which prevents it from becoming displaced. If it be desired to remove the disk 8, this may be accomplished by simply removing the ring 16. Where the valve is to be used in a vertical position only, gravity may be relied upon to seat the valve-disk, in which case the spring 13, with the ring 16, may be removed, as illustrated in Fig. 4; but for ordinary purposes the spring is employed, even though the valve is used in a vertical position, since it aids in seating the valve-disk and secures a firmer engagement between the parts.

In order to further guide the valve-disk, particularly when off its seat, I provide a plurality of lugs 18, preferably three, which project from the valve-disk 8 at the under side thereof—that is to say, at the side opposite that at which the sleeve 10 projects, as best shown in Figs. 1 and 2. The outer surfaces of said lugs lie adjacent to the inner surface of the valve-casing and are parallel therewith, so that as the valve-disk moves longitudinally the lugs 18 by their engagement with the inner face of the valve-casing are prevented from becoming displaced laterally. The lugs 18 are longer than the distance between the upper edge of the sleeve and the ring 16, so that said lugs never move beyond the lower edge of the valve-seat 6.

That which I claim as my invention, and desire to secure by Letters Patent, is—

A check-valve comprising a casing provided with a chamber and a bevel valve-seat at one end of said chamber, a cup-shaped valve, registering with the bore of the casing, adapted to fit on said bevel valve-seat, and provided with a plurality of openings to establish communication between the said chamber and the discharge end of said casing, said valve provided with a plurality of lugs projecting from one face thereof, an adjustable ring in the discharge end of the casing and arranged in the path of said valve to arrest the movement thereof, a bar carried by said ring and provided with a lug, and a conical spring, the base of which engages the valve and has its apex centered by the lug.

ALFRED STENWALL.

Witnesses:
ALEX. McLEAN,
SALOMON WIDHOLM.